United States Patent
Podszun et al.

(10) Patent No.: US 7,238,762 B2
(45) Date of Patent: Jul. 3, 2007

(54) WEAKLY ACIDIC CATION EXCHANGERS

(75) Inventors: Wolfgang Podszun, München (DE); Olaf Halle, Köln (DE); Reinhold Klipper, Köln (DE); Rudolf Wagner, Köln (DE); Pierre Vanhoorne, Monheim (DE); Wolfgang Zarges, Köln (DE)

(73) Assignee: Lanxess Deutschland GmbH, Leverkusen (DE)

( * ) Notice: Subject to any disclaimer, the term of this patent is extended or adjusted under 35 U.S.C. 154(b) by 0 days.

(21) Appl. No.: 11/509,984

(22) Filed: Aug. 25, 2006

(65) Prior Publication Data

US 2007/0045193 A1  Mar. 1, 2007

(30) Foreign Application Priority Data

Aug. 27, 2005 (DE) ............... 10 2005 040 625

(51) Int. Cl.
*C08F 20/10* (2006.01)
*C08F 20/06* (2006.01)
(52) U.S. Cl. .................. 526/317.1; 526/318
(58) Field of Classification Search .............. None
See application file for complete search history.

(56) References Cited

U.S. PATENT DOCUMENTS

| | | | | |
|---|---|---|---|---|
| 2,340,111 A | * | 1/1944 | D Alelio | 210/679 |
| 2,860,109 A | | 11/1958 | Abel et al. | 260/2.2 |
| 3,586,646 A | | 6/1971 | Corte et al. | 260/2.2 R |
| 3,637,535 A | | 1/1972 | Corte et al. | 260/2.1 |
| 5,175,193 A | | 12/1992 | Heller et al. | 521/31 |
| 2005/0090621 A1 | | 4/2005 | Happ et al. | 525/329.1 |

* cited by examiner

*Primary Examiner*—Paul A. Zucker
(74) *Attorney, Agent, or Firm*—Jennifer R. Seng

(57) ABSTRACT

The present invention relates to a process for producing weakly acidic cation exchangers of the polymethacrylic acid type by alkaline saponification of a crosslinked copolymer of alkyl methacrylate and methacrylic acid.

16 Claims, No Drawings

WEAKLY ACIDIC CATION EXCHANGERS

This application claims the benefit of German Application No. DE 10 2005 040 625.4 filed Aug. 27, 2005.

The present invention relates to a process for producing weakly acidic cation exchangers of the polymethacrylic acid type, and also uses thereof.

BACKGROUND OF THE INVENTION

From the prior art, bead-type cation exchangers of the polymethacrylic acid type are already known. This is a class of cation exchangers which can be used in numerous different applications in practice. An important field of use is water treatment technology, in which polyvalent cations, such as, for example, calcium, magnesium, lead or copper, but also carbonate anions, can be removed. A particular advantage of the methacrylate-based cation exchangers is that their regeneration can be performed not only using strong acid, such as hydrochloric acid or sulphuric acid, but also using carbon dioxide. A further field of application of cation exchangers of the polymethacrylic acid type is purification and separation of biologically active components, e.g. antibiotics, enzymes, peptides and nucleic acids, from their solutions, for example from reaction mixtures and from fermentation broths.

For the said applications, not only gel-type but also macroporous cation exchangers of the polymethacrylic acid type are required. The terms macroporous and gel-type are described in detail in the specialist literature, for example in Seidl, Malinsky, Dusek, Heitz, adv. Polymer Sci., Vol. 5 pages 113 to 213 (1967).

Cation exchangers of the polymethacrylic acid type can be produced by what is termed inverse suspension polymerization. In this process, an aqueous solution of methacrylic acid and crosslinker is dispersed in an organic solvent, such as cyclohexane, for example, as continuous phase to give spherical droplets, and these droplets are cured by polymerization at elevated temperature using a free-radical initiator.

Solvent-free production processes which are to be preferred, inter alia for ecological reasons, are also already known. In this case methacrylic acid itself is not used, but an alkyl ester of methacrylic acid in combination with a crosslinker is converted into bead-type crosslinked polyalkyl methacrylate by suspension polymerization in water which is converted into the polymethacrylic acid cation exchanger by downstream saponification. U.S. Pat. No. 2,340,111 describes, for example, insoluble copolymers having carboxyl groups for removing cations from water, with the carboxyl-containing copolymers being able to be produced by saponifying acrylic ester copolymers. DE 960 858 describes a process for producing gel-type polymers usable as cation exchangers by suspension polymerization of esters of acrylic acid and/or methacrylic acid and by subsequent saponification of the resultant polymers.

Whereas saponification of polyacrylic alkyl ester polymers to give polyacrylic acid polymers may be carried out very readily, the analogous reaction using methacrylate polymers, because of the higher stability to hydrolysis of the methacrylic esters, requires drastic reaction conditions, e.g. temperatures above 150° C. These drastic conditions are undesirable in practice, since they require increased technical resources and the resultant reaction product can change in its structure as a consequence of the temperature stress.

The object of the present invention is to provide a simple process for the production of gel-type and macroporous cation exchangers of the polymethacrylic acid type.

SUMMARY OF THE INVENTION

Subject matter of the present invention and solution of this object is therefore a process for producing cation exchangers of the polymethacrylic acid type which is characterized in that a) a monomer mixture of methacrylic acid alkyl ester, methacrylic acid, crosslinker, free-radical initiator and if appropriate porogen is cured by suspension polymerization in aqueous phase to give a bead polymer and b) the resultant bead polymer is saponified under alkaline conditions at a temperature of 100-160° C.

The methacrylic acid alkyl esters used in process step a) are esters having branched and unbranched C1 to C6 alkyl radicals. Examples which may be mentioned are:

methyl methacrylate, ethyl methacrylate, n-propyl methacrylate and isopropyl methacrylate. Methyl methacrylate is preferred.

Suitable crosslinkers within the meaning of the present invention are multifunctional ethylenically unsaturated compounds, such as, for example, butadiene, isoprene, divinylbenzene, divinyltoluene, trivinylbenzene, divinylnaphthalene, trivinylnaphthalene, divinylcyclohexane, trivinylcyclohexane, triallyl cyanurate, triallylamine, 1,7-octadiene, 1,5-hexadiene, cyclopentadiene, norbornadiene, diethylene glycol divinyl ether, triethylene glycol divinyl ether, tetraethylene glycol divinyl ether, butanediol divinyl ether, ethylene glycol divinyl ether, cyclohexanedimethanol divinyl ether, hexanediol divinyl ether and trimethylolpropane trivinyl ether.

Divinylbenzene is suitable in many cases. For most applications, commercial divinylbenzene quality grades which, in addition to the isomers of divinylbenzene, also contain ethylvinylbenzene, are sufficient. Use can also be made of mixtures of different crosslinkers, e.g. mixtures of divinylbenzene and divinyl ether.

The fraction of crosslinker of the monomer mixture is 2 to 50% by weight, preferably 4 to 25% by weight.

In addition to methacrylic acid alkyl esters, methacrylic acid and crosslinkers, further monomers which are polymerizable by free-radical mechanisms can be present in the monomer mixture in fractions of up to 20% by weight, preferably up to 10% by weight. Suitable monomers are, for example, styrene, vinyl acetate, acrylonitrile and acrylic acid alkyl esters.

Suitable initiators for the inventive process are, for example, peroxy compounds such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and also azocompounds, such as 2,2'-azobis(isobutyronitrile) or 2,2'-azobis(2-methylisobutyronitrile).

The initiators are generally used in amounts of 0.05 to 2.5% by weight, preferably 0.1 to 1.5% by weight, based on the monomer mixture.

In order to generate a macroporous structure in the inventive cation exchanger of the polymethacrylic acid type, what are termed porogens are added to the monomer mixture. Suitable substances for this are organic solvents which are miscible with the monomer. Those which may be mentioned by way of example are hexane, cyclohexane, octane, isooctane, isododecane, methyl ethyl ketone, methyl isobutyl ketone, butanol or octanol and isomers thereof. Porogens are also described in the patents DE 1 045 102 DE 1 113 570 and U.S. Pat. No. 4,382,124. The fraction of porogen is 5 to 70% by weight, preferably 10 to 65% by weight, based on the monomer mixture.

The monomer mixture is cured in process step a) by suspension polymerization in aqueous phase to give a bead polymer.

The suspension polymerization generally proceeds in the presence of a protective colloid dissolved in the aqueous phase. Suitable protective colloids are natural or synthetic water-soluble polymers, such as, for example, gelatin, starch, polyvinyl alcohol, polyvinylpyrrolidone, polyacrylic acid, polymethacrylic acid or copolymers of (meth)acrylic acid and (meth)acrylic acid esters. Very readily suitable compounds are also cellulose derivatives, in particular cellulose esters and cellulose ethers such as methylcellulose, carboxymethylcellulose, methylhydroxyethylcellulose, methylhydroxypropylcellulose and hydroxyethylcellulose. The amount of protective colloids used is generally 0.05 to 1% by weight, based on the aqueous phase, preferably 0.05 to 0.5% by weight.

The aqueous phase used in process step a) can optionally additionally contain a buffer system. Preference is given to buffer systems which set the pH of the aqueous phase at the start of polymerization to a value between 14 and 6, preferably between 13 and 8. Under these conditions, protective colloids containing carboxylic acid groups are completely or partially present as salts. In this manner, the activity of the protective colloids is favourably affected. Particularly highly suitable buffer systems contain phosphate or borate salts. The terms phosphate and borate within the meaning of the invention also comprise the condensation products of the orthoforms of corresponding acids and salts. The concentration of phosphate or borate in the aqueous phase is 0.5 to 500 mmol/l, preferably 2.5 to 100 mmol/l.

The addition of salts, such as, e.g. sodium chloride or sodium sulphate, to the aqueous phase is also possible within the context of the inventive process. A salt content of, for example, 5 to 10% by weight, can lower the solubility of methacrylic acid in the aqueous phase.

The aqueous phase can, in addition, contain a dissolved polymerization inhibitor. It has been found that addition of a water-soluble polymerization inhibitor effectively suppresses the formation of undesired fine polymer in the water phase. Inhibitors which come into consideration in this context are not only inorganic, but also organic substances. Examples of inorganic inhibitors are nitrogen compounds such as hydroxylamine, hydrazine, sodium nitrite and potassium nitrite, chromates such as sodium dichromate, salts of phosphorous acid such as sodium hydrogenphosphite and also sulphur compounds such as sodium dithionite, sodium thiosulphate, sodium sulphite, sodium bisulphite, sodium rhodanide or ammonium rhodanide. Examples of organic inhibitors are phenolic compounds such as hydroquinone, hydroquinone monomethyl ether, resorcinol, catechol, tert-butylcatechol, pyrogallol or condensation products of phenols with aldehydes. The concentration of the inhibitor is 5 to 1000 ppm (based on the aqueous phase), preferably 10 to 500 ppm, particularly preferably 10 to 250 ppm.

The particle size of the bead polymer formed in process step a) may be set with the aid of the agitator speed. In laboratory reactors having 3 to 5 liters of reaction volume, in general agitator speeds of 100 to 300 revolutions/min are used. Various agitator types can be used. Particularly suitable types are gate agitators and straight-arm paddle agitators. Under the said conditions, generally bead polymers having a mean particle size of approximately 200 to 750 µm are obtained.

The volumetric ratio of monomer mixture to aqueous phase is 1:0.75 to 1:6, preferably 1:1 to 1:2.5.

The polymerization temperature depends on the decomposition temperature of the initiator used. It is generally between 50 and 180° C., preferably between 55 and 130° C. The polymerization takes one hour to a few hours. It has proven useful to employ a temperature programme in which the polymerization is started at low temperature, for example 60° C., and the reaction temperature is increased with advancing polymerization conversion rate. In this manner, for example, the requirement for a safer reaction course and high polymerization conversion rate is very easily met. If in the polymerization a porogen was used, this is expediently removed from the reaction mixture by distillation subsequently to polymerization. Thereafter the polymer can be isolated and if appropriate washed and dried using conventional methods, for example by filtration or decantation.

The saponification or hydrolysis of the bead polymer from process step a) proceeds in process step b) of the inventive process.

Suitable hydrolysis media in this case are solutions of strong bases, such as, e.g., potassium hydroxide or sodium hydroxide. The concentration of the strong base is generally 5 to 50% by weight. Pure aqueous solutions of strong bases can be used. However, it is also possible and expedient with respect to the shortest possible saponification times to use alcoholic aqueous solutions. Very suitable alcohols are, e.g., methanol, ethanol, n-propanol and isopropanol. The fraction of alcohol in the hydrolysis medium can in this case be 10 to 60% by weight.

The amount of hydrolysis medium is selected in such a manner that the mixture of bead polymer and hydrolysis medium is readily stirrable. Generally, 700 ml to 2000 ml of hydrolysis medium are used per kg of bead polymer.

The hydrolysis preferably proceeds at temperatures of 90° C. to 160° C., particularly preferably 100° C. to 150° C. The saponification time is preferably 1 to 24 h, particularly preferably 4 to 12 h.

After the saponification, the reaction mixture of hydrolysis product and residual hydrolysis medium is cooled to room temperature and first diluted and washed with water.

When sodium hydroxide solution is used as hydrolysis medium, the weakly acidic cation exchanger is produced in the sodium form. For some applications it is expedient to convert the cation exchanger from the sodium form to the acid form. This exchange proceeds using sulphuric acid of a concentration of 5 to 50%, preferably 10 to 20%.

If desired, the inventive weakly acidic cation exchanger obtained can, for purification, be treated with deionized water at temperatures from 70 to 145° C., preferably from 105 to 130° C.

The present invention also relates to weakly acidic cation exchangers of the polymethacrylic acid type obtainable by
  a) curing a monomer mixture of methacrylic acid alkyl ester, methacrylic acid, crosslinker, free-radical initiator and if appropriate porogen by suspension polymerization in aqueous phase and
  b) alkaline saponification of the resultant bead polymer at a temperature of 100-160° C.

The present invention also relates to the use of the inventive weakly acidic cation exchangers of the polymethacrylic acid type
  for removing cations, colour particles or organic components from aqueous or organic solutions,
  for softening in neutral exchange of aqueous or organic solutions, for purification and work-up of waters of the chemical industry, the electronics industry and power stations, for separating off and purifying biologically active components, such as, for example, antibiotics, enzymes, peptides and nucleic acids from their solutions, for example from reaction mixtures and from fermentation broths.

In addition, the inventive cation exchangers can be used in combination with gel-type and/or macroporous anion exchangers for fully desalting aqueous solutions and/or condensates, in particular in drinking water treatment.

EXAMPLES

Example 1

Production of a Macroporous Weakly Acidic Cation Exchanger of the Polymethacrylic Acid Type a) Production of a Macroporous Bead Polymer 6.8 g of methylcellulose (Tylose MH 1008) were dissolved in 1856 ml of deionized water in a 4 l glass reactor. To this initial charge was introduced a monomer mixture consisting of 237.5 g of methyl methacrylate, 113.7 g of methacrylic acid, 103.6 g of divinylbenzene (81.2% strength divinylbenzene isomeric mixture in ethylstyrene), 6.8 g of dibenzoyl peroxide (75% pure water-moist product) and 682.2 g of isobutyl methyl ketone (99% pure) below the surface of the aqueous phase. The agitator speed was set to 175 rpm and the mixture is heated with stirring at 80° C. for 10 h. Subsequently the mixture was further stirred at 88° C. for 10 h. After cooling, 31.6 g of disodium hydrogenphosphate were added. The batch was washed by allowing it to stand for 30 min and filtering off the mother liquor by suction, subsequently stirring it with deionized water for 30 min and again filtering off the aqueous phase with suction. This procedure was repeated four times. For the distillation of isobutyl methyl ketone, a ratio product:water equal to 1:1 was set. Then, the mixture was slowly heated to 90-92° C. and isobutyl methyl ketone was distilled off. The bead polymer was washed in a plurality of portions over a 630 μm screen and a 350 μm screen.

This produced 453 g of bead polymer having a mean particle size of 467 μm.

b) Saponification of the Bead Polymer 286 g of polymer from example a), 728.8 ml of sodium hydroxide solution (50% strength by weight) and 71 ml of deionized water were charged into a 6 l autoclave.

The batch was heated to 100° C. and stirred at this temperature for 30 min. The autoclave was then closed and slowly heated to 145° C. The internal pressure raised in the course of this to 3.5 bar. Saponification was carried out for 12 h at 145° C. The resultant resin was transferred to a 00-glass frit column then washed to pH 8. Subsequently 44.8 ml of sulphuric acid monohydrate was added and the product vortexed by air introduction. Sufficient aqueous phase was removed such that the resin was still in solution and was washed neutral to pH 5. This produced 1085 ml of methacrylate resin in the H form having a total capacity of 1.65 mol/l and a mean particle size of 500 μm.

Example 2

Production of a Macroporous Weakly Acidic Cation Exchanger of the Polymethacrylic Acid Type Example 1 was repeated, use being made of a monomer mixture consisting of 300.1 g of methyl methacrylate, 45.5 g of methacrylic acid, 109.2 g of divinylbenzene (81.2% strength divinylbenzene isomeric mixture in ethylstyrene), 6.8 g of dibenzoyl peroxide (75% pure water-moist product) and 682.2 g of isobutyl methyl ketone (99% pure). This produced 443 g of bead polymer having a mean particle size of 380 μm. Alkaline saponification gave a methacrylate resin in the H form having a total capacity of 1.50 mol/l and a mean particle size of 454 μm.

Example 3

Production of a Gel-Type Weakly Acidic Cation Exchanger of the Polymethacrylic Acid Type a) Production of a Gel-Type Bead Polymer 1311 ml of deionized water were charged into a 4 l glass reactor. 324.6 g of sodium chloride and 1.953 g of hydroxyethylcellulose (Tylose H 4000 P) were dissolved within. Thereafter a monomer mixture consisting of 688.4 g of methyl methacrylate, 250.0 g of methacrylic acid, 61.6 g of divinylbenzene (81.2% strength divinylbenzene isomeric mixture in ethylstyrene) and 6.0 g of dibenzoyl peroxide (75% strength) were introduced below the surface of the aqueous phase. With stirring at 160 rpm, the mixture was heated to 63° C. in 1.5 h. After 2 h 30 min, the temperature was increased to 94° C. and kept for a further 3 h at this temperature. After cooling, the bead polymer was thoroughly washed over a 100 μm screen. This produced 949 g of transparent bead polymer having a mean particle size of 497 μm.

b) Saponification of the Bead Polymer 672.3 g of bead polymer from a), 694.9 ml of sodium hydroxide solution (50% strength) and 355 ml of completely ion-free water were charged into a 6 l autoclave. The mixture was heated to 100° C. and stirred at this temperature for 30 min. The autoclave was then closed and slowly heated to 145° C. The internal pressure rises in the course of this to 3.5 bar. Saponification was carried out for 12 h at 145° C. The resultant resin was transferred to a 00-glass frit column and washed with deionized water until the effluent has a pH of 8.

This produced 1270 ml of gel-type methacrylate resin having a mean particle size of 511 μm and a total capacity of 4.05 mol/l.

Methods of Analysis

Determination of the Total Capacity of the Resin

In a 100 ml measuring cylinder, 55 ml of weakly acidic cation exchanger were shaken on a vibrating bench under completely ion-free water and flushed into a filter tube. 300 ml of 15% strength hydrochloric acid were added in the course of 60 minutes. Subsequently the exchanger was washed with deionized water until the eluate is neutral. Of the resin, 50 ml were shaken and flushed into a filter tube. 600 ml of one normal sodium hydroxide solution were added in the course of 60 minutes and the eluate collected in a 1 liter conical flask. The resin was washed with 200 ml of deionized water, the eluate likewise was collected in the 1 liter conical flask. The conical flask was made up to the mark with completely ion-free water and mixed. 50 ml of solution was diluted in a glass beaker with 50 ml of completely ion-free water and titrated with 0.1 n hydrochloric acid to pH 4.3 using a pH electrode.

Total capacity (TC): the total capacity is a measure of the amount of acid groups in the resin.

Dimension: mol of acid groups per liter of resin

Calculation of TC: (30−consumption)/2.5=mol/liter of resin in the acid form.

What is claimed is:

1. A process for producing a weakly acidic cation exchanger of the polymethacrylic acid type comprising:
    a) curing, by suspension polymdrization in aqueous phase, a monomer mixture comprising a methacrylic acid alkyl ester, a methacrytic acid, a crosslinker, and a free-radical initiator, whereby a bead polymer is formed; and
    b) saponifying the bead polymer under alkaline conditions at a temperature of 100-160° C.

2. The process according to claim 1, wherein in process step a) the monomer mixture comprises a methyl methacrylate, a methacrylic acid, a crosslinker, and a free-radical initiator.

3. The process according to claim 2, wherein the monomer mixture additionally comprises a porogen.

4. The process according to claim 2, wherein the monomer mixture used in process step a) contains 10 to 35% by weight of the, methacrylic acid based on the sum of the methyl methacrylate, methacrylic acid and crosslinker.

5. The process according to claim 1, wherein the monomer mixture used in process step a)additionally comprises a porogen.

6. The process according to claim 1, wherein the crosslinker is divinylbenzene, trivinylbenzene, ethylene glycol divinyl ether, diethylene glycol divinyl ether, triethylene glycol divinyl ether, butanediol divinyl ether, hexanediol divinyl ether, cyclohexanedimethanol divinyl ether, trimethylolpropane trivinyl ether or a mixture thereof.

7. The process according to claim 5, wherein the porogen is methyl isobutyl ketone, hexane, cyclohexane, octane, isooctane, isododecane, n-butanol, 2-butanol, isobutanol, tert-butanol, octanol or a mixture thereof.

8. A weakly acidic cation exchanger of the polymethacrylic acid type obtained by:
    a) curing a monomer mixture comprising a methacrylic acid alkyl ester, a methacrylic acid, a crosslinker, and a free-radical initiator by suspension polymerization in aqueous phase; and
    b) saponifying the bead polymer under alkaline conditions at a temperature of 100-160° C.

9. A process for removing cations, colour particles or organic components from aqueous or organic solution, comprising:
    contacting the weakly acidic cation exchanger of the polymethacrylic acid type according to claim 8 with said cations, colour particles or organic components.

10. The process according to claim 5, wherein the monomer mixture contains 5 to 70% by weight of the porogen based on the sum of the methyl methacrylate, methacrylic acid, and crosslinker.

11. A process for softening in neutral exchange of aqueous or organic solution, comprising: contacting the weakly acidic cation exchanger of the polymethacrylic acid type according to claim 8 with aqueous or organic solution.

12. A process for the purification and work-up of waters of the chemical industry, the electronics industry and power stations, comprising:
    contacting the weakly acidic cation exchanger of the polymethacrylic acid type according to claim 8 with said waters.

13. A process for decolourizing and desalting wheys, thin gelatin broths, fruit juices, fruit musts and aqueous solutions of sugars, comprising:
    contacting the weakly acidic cation exchanger of the polymethacrylic acid type according to claim 8 with said wheys, thin gelatin broths, fruit juices, fruit musts and aqueous solutions of sugars.

14. A process for separating off and purifying biologically active components from their solutions, comprising:
    contacting the weakly acidic cation exchanger of the polymethacrylic acid type according to claim 8 with said biologically active components.

15. The process according to claim 14, wherein said biologically active components are selected from the group consisting of antibiotics, enzymes, peptides and nucleic acids.

16. The process according to claim 15, wherein said solutions are selected from the group consisting of reaction mixtures and fermentation broths.

* * * * *

UNITED STATES PATENT AND TRADEMARK OFFICE
CERTIFICATE OF CORRECTION

PATENT NO. : 7,238,762 B2  Page 1 of 1
APPLICATION NO. : 11/509984
DATED : July 3, 2007
INVENTOR(S) : Wolfgang Podszun It is certified that error appears in the above-identified patent and that said Letters Patent is hereby corrected as shown below:

In Claim 1 at column 7, line 17, please correct the error "polyrnethacrylic", which should be "polymethacrylic";

In Claim 1 at column 7, line 18, please correct the error "polymdrization", which should be "polymerization"; and In Claim 1 at column 7, line 20, please correct the error "methacrytic", which should be --methacrylic--.

Signed and Sealed this

Fourteenth Day of August, 2007

JON W. DUDAS
*Director of the United States Patent and Trademark Office*